(12) United States Patent
Janik et al.

(10) Patent No.: US 7,846,244 B2
(45) Date of Patent: Dec. 7, 2010

(54) SEALING AGENT FOR WATERPROOF BARRIERS

(76) Inventors: Grazyna Janik, ul. 23 Stycznia 15, Slawkow (PL) 41-260; Roman Kus, ul. 23, Stycznia 15, Slawkow (PL) 41-260

( * ) Notice: Subject to any disclaimer, the term of this patent is extended or adjusted under 35 U.S.C. 154(b) by 290 days.

(21) Appl. No.: 11/724,369

(22) Filed: Mar. 15, 2007

(65) Prior Publication Data
US 2007/0227397 A1    Oct. 4, 2007

(30) Foreign Application Priority Data
Mar. 31, 2006    (PL) ..................... 379347

(51) Int. Cl.
C04B 14/00    (2006.01)
C09K 3/00    (2006.01)

(52) U.S. Cl. ............... 106/2; 106/706; 106/718; 106/811; 106/709; 106/716; 106/692; 106/814; 106/33; 106/705; 106/707; 106/713

(58) Field of Classification Search ............ 106/2, 106/706, 718, 811, 709, 716, 692, 694, 814, 106/33, 705, 707, 713
See application file for complete search history.

(56) References Cited

U.S. PATENT DOCUMENTS

| 6,030,447 | A * | 2/2000 | Naji et al. ............ 106/718 |
| 6,506,248 | B1 * | 1/2003 | Duselis et al. ........ 106/713 |
| 2002/0157573 | A1 * | 10/2002 | Pellett ............... 106/400 |
| 2005/0208287 | A1 * | 9/2005 | Naji et al. .......... 428/294.7 |

FOREIGN PATENT DOCUMENTS

PL    174766 B1 *    1/1996

* cited by examiner

Primary Examiner—Elizabeth D Wood
(74) Attorney, Agent, or Firm—Skinner and Associates

(57) ABSTRACT

The sealing agent for waterproof barriers in the form of a clay and cement suspension made of polymineral clays, characterized by the fact that it contains 3-15% parts by weight of cement, up to 65% parts by weight of fly-ash and/or rock dust of similar granulation, and 30-60% parts by weight, or better up to 50% parts by weight, of water suspension of clay, heavy or loamy.

6 Claims, No Drawings

SEALING AGENT FOR WATERPROOF BARRIERS

BACKGROUND

1. Field

The subject of the invention is a sealing agent for making waterproof barriers in the form of water suspension made of polymineral clays.

2. Background Information

Patent No. PL 174766 of applicants discloses a sealing agent for making waterproof barriers in the form of water solution made of polymineral clays.

The agent is a clay and cement water solution comprising 6-15% of cement, 19-34% of clay, or better heavy clay with a plasticity factor $J_L=15$-20, in a granulometric composition of which the particles <5 μm make up at least 60%, and particles >50 μm make up not more than 5%. The mineral composition of the clay shall include kaolinite, hydromica and quartz, while in its chemical composition the content of $Al_2O_3$ should be about 20-28% and the content of $SiO_2$ should be 50-60%. Its transfer capacity should equal 15-30 milligramme equivalent units on 100 g of dry clay and core composition of transferable cations is represented by $Ca^{2+}>Na^*>K^+>Mg^{2-}$. The agent is to be dissolved to 100% with water and/or natural brine. Moreover, the patented sealing agent includes coherent and/or gritty clay, with a plasticity factor of $J_L=6$-18, in the granulometric composition of which the particles <5 μm make up 40-80%, and particles >50 μm make up about 5-9%. The mineral composition of the clay includes kaolinite, hydromica, mixed layer formations, quartz and carbonates while in its chemical composition the content of $Al_2O_3$ is about 18-24% and the $SiO_2$ content about 55-65%. Its transfer capacity equals 25-40 milligramme equivalent units on 100 g of dry clay and core composition of transferable cations is represented by $Ca^{2+}>Na^+>K^+>Mg^{2+}$.

The available sealing agent is particularly suitable for making waterproof barriers in rock fissures and loose soil by means of the injection method for rock, and deep soil mixing for loose soil.

However, due to its Theological, structural and mechanical properties, the available sealing agent does not guarantee in all geological conditions the leakproofness of the waterproof barriers, made by filling with the sealing agent solution formerly made openings, fissures, ditches, excavations, and other similar, deep and narrow hollows.

It transpired, however, that the addition of fly-ash (flue dusts) and/or rock dust of similar granulation as filling material to the patented sealing agent in the form of a clay and cement solution, with a simultaneous modification of the solution formula, produces a very efficient sealing agent for the construction of waterproof barriers by filling formerly excavated hollows in the ground with the sealing agent solution.

DETAILED DESCRIPTION

In accordance with the invention, the reformulated sealing agent for waterproof barriers in the form of a clay and cement suspension made of polymineral clays, is characterized by the content of 3-15% parts by weight of cement, up to 65% parts by weight of fly-ash and/or rock dust and about 30-60% parts by weight, and better up to 50% parts by weight, of water suspension of clay, heavy and/or loamy.

The product seems to have improved parameters when clay is added with a granulometric composition in which the particles <5 μm make up at least 60%, and the mineral composition includes kaolinite, hydromica and quartz, with a chemical composition characterized by a $Al_2O_3$ content of about 20-28% and $SiO_2$ at about 50-60%, a transfer capacity equal to 15-30 milligramme equivalent units on 100 g of dry clay, and a core composition of transferable cations represented by $Ca^{2+}>Na^+>K+>Mg^{2+}$.

The reformulated agent requires the addition of portland cement, or portland cement with a sulphate resistance feature, or low aluminate cement and aluminium oxide containing cement.

The water content in water suspension is so adjusted that, after all the ingredients have been mixed, the density of a freshly made suspension of ready to use sealing agent equals from 1.40 to 1.65 $Mg/m^3$, and better not less than 1.45 $Mg/m^3$.

The sealing agent contains at least 5% parts by weight of cement, up to 65% parts by weight of fly-ash and/or rock dust of similar granulation, and 30-60% parts by weight of water suspension of clay with such a content of water that a freshly made suspension of ready to use sealing agent has a density of 1.40-1.65 $Mg/m^3$.

The sealing agent is cheap, easy to prepare at a construction site and easy to apply while its Theological, structural and mechanical properties enable the construction of very efficient watertight barriers. The practical tests made 28 days after the construction of filter proof barriers of the above mentioned agent proved that the axial compression of the barriers equalled at least 0.3 MPa, and the filtration factor was less than 1×10−8 m/s.

The invention is further described in the following practical examples of its composition and application.

Example I

The sealing agent for waterproof barriers contains 1% parts by weight of portland cement, 52% parts by weight of fly-ash and rock dust mix, and 41% parts by weight of water suspension of loamy clay.

Any rock dust might be used for the preparation of the agent, provided that its granulation is similar to that of fly-ash, for instance calcareous, basaltic or dolomite dust might be used.

The clay which was used for the purpose had a granulometric composition in which the particles <5 μm made up at least 60%, the mineral composition included kaolinite, hydromica and quartz, the chemical composition had the content of $Al_2O_3$ at about 20-28% and $SiO_2$ content at about 50-60%. Its transfer capacity was equal to 15-30 milligramme equivalent units on 100 g of dry clay, and a core composition of transferable cations was represented by $Ca^{2+}>Na^+>K>Mg^{2+}$.

The agent can be applied in a fresh water environment with low mineral content.

The sealing agent is to be prepared outdoors, close to the construction site of a waterproof barrier, using the following tools:
- a clay mixer;
- a vibratory sieve for separation of small stones, sand and other particles from the clay and water suspension;
- a tank for storage of the suspension;
- a set of pumps and a piping system for pumping the suspension and for water supply;
- a silo and a feeding device for the supply of fly-ash and, optionally, a silo with a rock dust feeder;
- a silo and a feeding device for the supply of cement;
- a paddle mixer;

a tank for periodic storage of the suspension of the sealing agent.

The preparation of the sealing agent is a two-stage process. First, the basic suspension of clay with a density of 1.18 Mg/m³ is to made. To prepare the suspension, an appropriate amount of water should be poured into a clay mixer, and while the mixer is operational, an appropriate amount of clay should be added gradually. The density of the suspension should be tested from time to time. If too dense, add water to dilute until you get the desired density of the basic suspension.

The process of preparation of the basic suspension is considered completed when the density parameters of the suspension are stabilised and as required.

In the next step the basic suspension is poured onto vibratory sieves and directed towards a storage tank. The production cycle is then repeated with a new portion of ingredients until an appropriate amount of the suspension is produced. To prevent sedimentation of the stored suspension while new portions are being produced, it should periodically be pumped around in a tank—pump—tank cycle. The production of the suspension of the reformulated sealing agent is made at the second stage of the process, which takes place just before using the sealing agent at the waterproof barrier construction site.

To make the sealing agent itself, an appropriate amount of the basic suspension should be pumped into a paddle mixer, to which an appropriate amount of cement should added next. All substances shall be mixed for at least 5 to 10 minutes. While the ingredients are being paddled, an appropriate amount of fly-ash with an optional addition of rock dust should be added gradually. Density tests should be made from time to time to check the parameters.

To get the desired density of the basic suspension water should be added to dilute until the suspension achieves an appropriate density. The process of preparation of the suspension of the sealing agent is considered completed when the density parameters of the suspension are stabilised and as required.

Next, the ready to use sealing agent is collected in a second tank, from which it is pumped directly to the waterproof barrier construction site.

When an appropriate amount of the sealing agent has been piped into the place or there is a break in the piping process lasting more than 15-20 minutes, the pumps, piping system and the storage tank for the sealing agent should be washed with water.

Example II

The sealing agent for waterproof barriers contains 3% parts by weight of portland cement, 50% parts by weight of fly-ash with an increased content of CaO and 47% by weight of water suspension of loamy clay characterized by the parameters specified in Example I. The agent is to be applied in a fresh water environment. The preparation of the sealing agent is a two stage process as described in Example I.

Example III

The sealing agent for waterproof barriers contains 5% parts by weight of portland cement resistant to sulphates, 45% parts by weight of fly-ash and 50% by weight of water solution of loamy clay meeting the parameters specified in Example I. The agent can be applied both in a fresh and sea water environment. The preparation of the sealing agent is a two stage process as described in Example I.

What is claimed is:

1. A sealing agent for waterproof barriers comprising 3-15% by weight of cement, 40 to 65% by weight of fly-ash and/or rock dust of similar granulation, and 30-60% by weight, of water suspension of clay, heavy or loamy.

2. The sealing agent for waterproof barriers in accordance with claim 1 characterized in containing 50 to 60% by weight of water suspension of clay.

3. The sealing agent for waterproof barriers in accordance with claim 1 characterized by the fact that the water content is so adjusted, that the density of a freshly made suspension of ready to use sealing agent equals from 1.40 to 1.65 Mg/m³.

4. The sealing agent for waterproof barriers in accordance with claim 3 characterized by the density of a freshly made suspension of ready to use sealing agent equals not less than 1.45 Mg/ml.

5. The sealing agent for waterproof barriers in accordance with claim 1 characterized by the clay having a plasticity factor of $J_L$=6-14.

6. A sealing agent in a fresh ready to use suspension, for construction of waterproof barriers filling excavated hollows in ground comprising
   a. 3-15% by weight of cement,
   b. 40 to 65% by weight of fly-ash, and
   c. 45 to 60% by weight, of water suspension of polymineral clay including kaolinite, hydromica and quartz, and having a density of 1.40 to 1.65 Mg/m³, the clay having:
      i. a plasticity factor of $J_L$=6-14
      ii. the water content being so adjusted that the density of the freshly made suspension equals from 1.40 to 1.65 Mg/m³;
      iii. a granulometric composition in which particles <5 μm in size make up at least 60% by weight of the agent,
      iv. the mineral composition of the clay includes kaolinite, hydromica and quartz, and the chemical composition has the content of $Al_2O_3$ of about 20-28% by weight and $SiO_2$ content of about 50-60% by weight,
      v. with a transfer capacity equal to 15-30 milligramme equivalent units on 100 g of dry clay, and
      vi. a core composition of transferable cations represented by Ca2'>Na+>K+>Mg2'.

* * * * *